Patented June 21, 1932

1,863,681

UNITED STATES PATENT OFFICE

JAN AL, OF AMSTERDAM, NETHERLANDS, ASSIGNOR TO NAAMLOOZE VENNOOTSCHAP DE BATAAFSCHE PETROLEUM MAATSCHAPPIJ, OF THE HAGUE, NETHERLANDS

PROCESS FOR THE MANUFACTURE OF HYDROGEN

No Drawing. Original application filed June 8, 1929, Serial No. 369,533, and in the Netherlands July 5, 1928. Divided and this application filed November 13, 1930. Serial No. 495,531.

This application is a division of my co-pending application, Serial Number 369,533, filed June 8, 1929, relating to the manufacture of a nickel catalyst in a finely divided state for the catalytic manufacture of hydrogen from a mixture of water-vapour and a hydrocarbon. The process consists in treating a nickel salt with a solution, which tends to convert said salt into nickel hydroxide, and further reducing the hydroxide to nickel by treating it with hydrogen. It is essentially characterized in that less than the theoretical quantity of the aforesaid solution is used.

It is known that hydrocarbons may be converted into hydrogen by heating them together with water-vapour in the presence of a catalyst. Thus, for instance, methane is converted into hydrogen according to the equation:

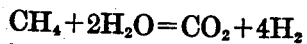
$$CH_4 + 2H_2O = CO_2 + 4H_2$$

A well-known catalyst for the above reaction is nickel, which is generally prepared by converting an aqueous nickel salt solution, for instance a solution of nickel nitrate, by means of sodium hydroxide or the like into nickel hydroxide, which is further reduced to nickel by heating it in a stream of hydrogen.

The conversion into nickel hydroxide, which precipitates from the solutions, is often effected in the presence of a suitable carrier, such as grained porous stone, silica gel and the like. As a result the nickel hydroxide is precipitated on the carrier, whereafter the carrier together with the nickel hydroxide is heated in a stream of hydrogen, so that after the reduction the nickel is finely divided on the carrier.

I have now found that the conversion of hydrocarbons into hydrogen in the manner described above is considerably improved when using the catalyst described in my co-pending application Serial Number 369,533, the manufacture of which is essentially characterized in that less than the theoretical quantity of the agent for precipitating the nickel hydroxide is used.

Example 40 grammes nickel nitrate $(Ni(NO_3)_2 6 aq.)$ is dissolved in 600 cc. water.

This solution, into which, if necessary, the carrier can be put, is heated to about 40° centigrade and, while being stirred, is precipitated with about 200 cc. of 5% NaOH solution in such a manner that the green colour of the dissolved nickel salt is still clearly perceptible.

This is followed by filtering and washing, first with hot then with cold water.

The product obtained is reduced with hydrogen at 350° C.

If necessary the nickel catalyst can be applied together with a promoter. The oxides of vanadium, chromium, potassium, magnesium and aluminium are mentioned as examples of promoters as shown by United States patent to Williams No. 1,673,032, dated June 12, 1928.

With this catalyst, methane is converted with 2.1 times an excess of steam.

With 18 cc. contact volume (i. e. the apparent volume occupied by the catalyst) and a methane speed of 600 cc. per hour, by conducting the gas one time over the catalyst at 650° centigrade a gas mixture is obtained which, after condensation of the water and absorption of the carbon dioxide, contains 72.4% hydrogen.

What I claim is:

A process of manufacturing hydrogen by heating a mixture of hydrocarbon and water vapour, in the presence of a nickel catalyst which is prepared by treating a nickel salt with less than the theoretical quantity of a solution which tends to convert said salt into nickel hydroxide, and further reducing the hydroxide to nickel by treating it with hydrogen.

In testimony whereof I have affixed my signature.

JAN AL.